(12) United States Patent
Liu

(10) Patent No.: US 11,370,445 B2
(45) Date of Patent: Jun. 28, 2022

(54) ROAD GRADIENT DETERMINING METHOD AND APPARATUS, STORAGE MEDIUM, AND COMPUTER DEVICE

(71) Applicant: TENCENT TECHNOLOGY (SHENZHEN) COMPANY LIMITED, Guangdong (CN)

(72) Inventor: Chun Liu, Shenzhen (CN)

(73) Assignee: TENCENT TECHNOLOGY (SHENZHEN) COMPANY LIMITED, Shenzhen (CN)

( * ) Notice: Subject to any disclaimer, the term of this patent is extended or adjusted under 35 U.S.C. 154(b) by 0 days.

(21) Appl. No.: 17/071,605

(22) Filed: Oct. 15, 2020

(65) Prior Publication Data

US 2021/0024074 A1    Jan. 28, 2021

Related U.S. Application Data

(63) Continuation of application No. PCT/CN2019/108231, filed on Sep. 26, 2019.

(30) Foreign Application Priority Data

Sep. 28, 2018 (CN) .......................... 201811143089.1

(51) Int. Cl.
*B60W 40/076* (2012.01)
*G06T 7/521* (2017.01)

(52) U.S. Cl.
CPC .......... *B60W 40/076* (2013.01); *G06T 7/521* (2017.01); *B60W 2420/42* (2013.01);
(Continued)

(58) Field of Classification Search
CPC .......... B60W 40/076; B60W 2420/42; B60W 2420/62; G05D 1/0061; G05D 1/0088;
(Continued)

(56) References Cited

U.S. PATENT DOCUMENTS

| 2014/0067155 | A1* | 3/2014 | Yu | .......................... B60W 40/13 701/1 |
| 2018/0057003 | A1* | 3/2018 | Hyun | ................ B60W 50/0097 |
| 2019/0005667 | A1* | 1/2019 | Khawaja | ................. G06T 7/536 |

FOREIGN PATENT DOCUMENTS

| CN | 101930623 | 12/2010 |
| CN | 102201035 | 9/2011 |

(Continued)

OTHER PUBLICATIONS

Broggi, Alberto, et al. "Terrain mapping for off-road Autonomous Ground Vehicles using rational B-Spline surfaces and stereo vision." 2013 IEEE Intelligent Vehicles Symposium (IV). IEEE, 2013. (Year: 2013).*

(Continued)

*Primary Examiner* — Geoffrey E Summers
(74) *Attorney, Agent, or Firm* — Arentfox Schiff LLP

(57) ABSTRACT

A road gradient determining method includes obtaining a three-dimensional road image formed by a two-dimensional road image of a road and laser point cloud data of the road and selecting a plurality of nodes from the three-dimensional road image as control points. The method further includes generating, according to the control points, a first spline curve indicating a road elevation and converting the first spline curve into a second spline curve indicating a road gradient. Finally, the method includes obtaining location information and determining a first road gradient according to the location information and the second spline curve. Apparatus and non-transitory computer-readable storage medium counterpart embodiments are also contemplated.

20 Claims, 6 Drawing Sheets

(52) U.S. Cl.
CPC ............... *B60W 2420/62* (2013.01); *G06T 2207/10028* (2013.01); *G06T 2207/30256* (2013.01)

(58) Field of Classification Search
CPC .... G05D 1/021; G05D 1/0214; G05D 1/0221; G05D 1/0223; G06T 7/521; G06T 2207/10028; G06T 2207/30256; G01S 7/4808; G01S 17/89; G01S 17/931; G01S 17/06; G01S 17/08; G01S 17/894
USPC .................................................. 382/104, 154
See application file for complete search history.

(56) References Cited

FOREIGN PATENT DOCUMENTS

| CN | 105444735 | 3/2016 | | |
|----|-----------|--------|---|---|
| CN | 105806347 | 7/2016 | | |
| CN | 107560599 | 1/2018 | | |
| CN | 108267747 | 7/2018 | | |
| CN | 110161513 | 8/2019 | | |
| GB | 2 471 276 A | 12/2010 | | |
| GB | 2471276 A | * | 12/2010 | .......... G05D 1/0274 |
| JP | 2012007922 | 1/2012 | | |

OTHER PUBLICATIONS

Shen, C. N. Recursive Gradient Estimation Using Splines for Navigation of Autonomous Vehicles. Army Armament Research and Development Center Watervliet NY Large Caliber Weapon Systems Lab, 1985. (Year: 1985).*
International Search Report dated Jan. 2, 2020 in International Application No. PCT/CN2019/108231, (8 pages).
Written Opinion dated Jan. 2, 2020 in International Application No. PCT/CN2019/108231. (4 pages).
Extended European Search Report dated Apr. 23, 2021 in European Application No. 19864762.0, 11 pgs.
Aleksey Boyko et al.: Extracting roads from dense point clouds in large scale urban environment, ISPRS Journal of Photogrammetry and Remote Sensing, vol. 66, No. 6, pp. S2-S12, XP028346804, ISSN: 0924-2716, DOI: 10.1016/J.ISPRSJPRS.2011.09.009, 11 pgs.

* cited by examiner

ROAD GRADIENT DETERMINING METHOD AND APPARATUS, STORAGE MEDIUM, AND COMPUTER DEVICE

RELATED APPLICATION

This application is a continuation of International Application No. PCT/CN2019/108231, filed on Sep. 26, 2019, which claims priority to Chinese Patent Application No. 201811143089.1, filed on Sep. 28, 2018. The entire disclosures of the prior applications are hereby incorporated by reference in their entirety.

FIELD OF THE TECHNOLOGY

This application relates to the field of self-driving technologies, including a road gradient determining method and apparatus, a storage medium, and a computer device.

BACKGROUND OF THE DISCLOSURE

In the self-driving process, a self-driving motor vehicle needs to timely anticipate a gradient change in the road ahead according to a current location, to make a timely adjustment in the vehicle speed according to a road condition ahead, thereby ensuring safety and comfort of the passengers.

A commonly used method or computer system for determining a road gradient involves: selecting, directly along a two-dimensional road line, three-dimensional laser points closest to nodes on the two-dimensional road line from three-dimensional laser point cloud data, reading an elevation value of the obtained three-dimensional laser points, and then calculating an elevation difference and a horizontal distance between two three-dimensional laser points, to determine the road gradient. However, when the road gradient is determined by using the two-dimensional road line and the three-dimensional laser point cloud data, the horizontal distance is inevitably introduced. Due to instability factors in determining horizontal coordinates, precision of the road gradient is reduced.

SUMMARY

Based on the foregoing descriptions, a road gradient determining method, apparatus, and non-transitory computer-readable storage medium are provided, to resolve the problem of low precision of determining a road gradient and other problems (or computer systems having such and other problems).

In an embodiment, a road gradient determining method, applied to a computer device, includes obtaining, by processing circuitry of the computer device, a three-dimensional road image formed by a two-dimensional road image of a road and laser point cloud data of the road, and selecting, by the processing circuitry of the computer device, a plurality of nodes from the three-dimensional road image as control points. The method further includes generating, by the processing circuitry of the computer device, according to the control points, a first spline curve indicating a road elevation, and converting, by the processing circuitry of the computer device, the first spline curve into a second spline curve indicating a road gradient. Finally, the method includes obtaining, by the processing circuitry of the computer device, location information, and determining, by the processing circuitry of the computer device, a first road gradient according to the location information and the second spline curve.

In an embodiment, a road gradient determining apparatus includes processing circuitry configured to obtain a three-dimensional road image formed by a two-dimensional road image of a road and laser point cloud data of the road, and select a plurality of nodes from the three-dimensional road image as control points. The processing circuitry is further configured to generate, according to the control points, a first spline curve indicating a road elevation, and convert the first spline curve into a second spline curve indicating a road gradient. Finally, the processing circuitry is further configured to obtain location information, and determine a first road gradient according to the location information and the second spline curve.

In an embodiment, a non-transitory computer-readable storage medium stores computer-readable instructions thereon, which, when executed by a processor, cause the processor to perform a road gradient determining method. The method includes obtaining a three-dimensional road image formed by a two-dimensional road image of a road and laser point cloud data of the road, and selecting a plurality of nodes from the three-dimensional road image as control points. The method further includes generating, according to the control points, a first spline curve indicating a road elevation, and converting the first spline curve into a second spline curve indicating a road gradient. Finally, the method includes obtaining, location information, and determining a first road gradient according to the location information and the second spline curve.

According to the foregoing road gradient determining method, apparatus, and storage medium, the three-dimensional road image is formed by the two-dimensional road image and the laser point cloud data of the road, the plurality of nodes is selected from the three-dimensional road image as the control points to generate the first spline curve indicating the road elevation, and the first spline curve is converted into the second spline curve indicating the road gradient. Due to geometric continuity and local constraints of the spline curves, consistency and continuity of the road gradient data are ensured, thereby avoiding introduction of a horizontal error. Therefore, when the road gradient is determined according to the second spline curve, precision of the road gradient can be effectively improved.

DESCRIPTION OF EMBODIMENTS

To illustrate the objectives, technical solutions, and advantages of this application, this application is further described in detail below with reference to the accompanying drawings and the embodiments. It is to be understood that the specific embodiments described herein are merely used for explaining this application, and are not intended to limit this application.

Figure 1:
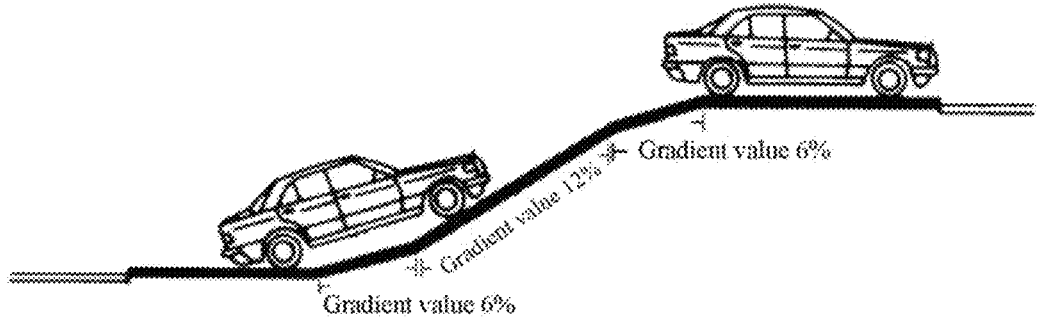
FIG. 1 is a diagram of an application environment of a road gradient determining method according to an embodiment.

FIG. 1 is a diagram of an application environment of a road gradient determining method according to an embodiment. Referring to FIG. 1, the road gradient determining method may be applied to a computer device. The computer device may be a moving terminal, or may be a server. When the method is applied to the moving terminal, in a self-driving process, the moving terminal may obtain a three-dimensional road line (for example, a three-dimensional road image) by using a two-dimensional road line (for example, a two-dimensional road image) and laser point cloud data of a road, select a plurality of control points from the three-dimensional road line to draw an elevation spline curve, convert the elevation spline curve into a gradient spline curve, and then determine a road gradient ahead according to location information of the moving terminal and the gradient spline curve, so as to adjust a driving speed of the moving terminal according to the gradient information. The two-dimensional road line and the laser point cloud data of the road herein may be stored in the terminal, or may be stored in the server. A communication connection is established between the terminal and the server. The terminal may obtain the two-dimensional road line and the laser point cloud data of the road from the server. The location information is obtained in real time by using a positioning system of the moving terminal.

When the method is applied to the server, in the self-driving process, the server and the moving terminal are in a networked state. The server may obtain the three-dimensional road line by using the two-dimensional road line and the laser point cloud data of the road, select the plurality of control points from the three-dimensional road line to draw the elevation spline curve, and convert the elevation spline curve into the gradient spline curve. Then, the server may obtain the location information of the moving terminal by using the positioning system of the moving terminal, determine the road gradient ahead according to the location information and the gradient spline curve, determine the driving speed of the terminal according to the road gradient ahead, and then send an adjustment instruction to the moving terminal, where the adjustment instruction includes the determined driving speed, so as to adjust the driving speed of the moving terminal. The two-dimensional road line and the laser point cloud data of the road herein are stored in the server, and the location information is obtained in real time by using the positioning system of the moving terminal. There is an association relationship between the two-dimensional road line and the location information, that is, the two-dimensional road line may be a road line near the location of the moving terminal. When the road gradient is determined, the road gradient is determined by using the gradient spline curve obtained according to the two-dimensional road line near the location.

The two-dimensional road line may be a road line (or road image) near the location of the moving terminal. For example, when the moving terminal drives on any one road, the road line may be a road line (or road image) to which a location of the moving terminal belongs; or when the moving terminal does not drive on the road, the road line may be a road line (road image) closest to the location of the moving terminal.

The moving terminal includes a motor vehicle having a self-driving function, or a self-driving device on a motor vehicle having a self-driving function. The self-driving refers to self-driving implemented by using an automatic control system. In a case of unmanned control, a motor vehicle having a self-driving function can automatically drive on the road, and can perform a corresponding driving operation according to traffic conditions. For example, if there is a slow-driving vehicle ahead, the self-driving vehicle can automatically decelerate or overtake. The motor vehicle having a self-driving function includes, but is not limited to, a family car, a sport utility vehicle (SUV), a passenger car, a truck, a tram, a battery car, a motorcycle, and the like.

Figure 2:
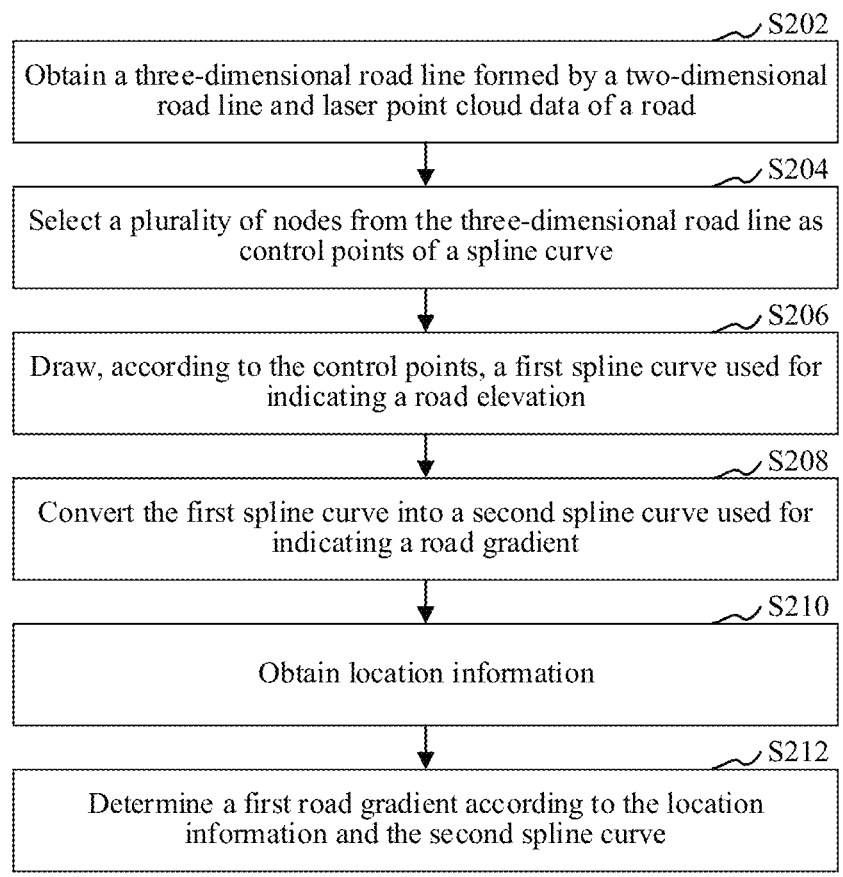
FIG. 2 is a schematic flowchart of a road gradient determining method according to an embodiment.

As shown in FIG. 2, in an embodiment, a road gradient determining method is provided. This embodiment is mainly described by using an example in which the method is applied to the moving terminal in FIG. 1. Referring to FIG. 2, the road gradient determining method specifically includes the following steps.

In step S202, a three-dimensional road line formed by a two-dimensional road line and laser point cloud data of a road are obtained.

The two-dimensional road line may be referred to as a two-dimensional road navigation line (or image), including longitudinal information and transverse information of a road, where the transverse direction refers to a direction from a center line of the road to two sides of the road, and the longitudinal direction refers to a direction of the center line of the road, that is, a direction in which a vehicle drives along the center line of the road. For example, the two-dimensional road line may be a road image displayed on a display screen of the moving terminal in a navigation process. The laser point cloud may be a set of laser points obtained by scanning a road surface by using a three-dimensional laser scanner or a photographic scanner. The laser point cloud data may be information about the laser point cloud and each laser point. For example, in a three-dimensional coordinate system, the information about the laser point includes information in directions of an X-axis, a Y-axis, and a Z-axis, where information on the X-axis may represent longitudinal information of the road, information on the Y-axis may represent transverse information of the road, and information on the Z-axis may represent elevation information of the road. The three-dimensional road line may be a road line obtained after the elevation information is added to the two-dimensional road line.

In an embodiment, the laser point cloud data may be inputted into the moving terminal when an electronic map is produced, or obtained through scanning the road ahead of the moving terminal in a driving process by using a laser.

In an embodiment, an implementation of constructing the three-dimensional road line (or three-dimensional road image) may include: obtaining the two-dimensional road line (or image) and the laser point cloud data of the road; selecting, from the laser point cloud data, a laser point closest to a point on the two-dimensional road line; obtaining an elevation value of the laser point; and using the elevation value as an elevation value of the corresponding point on the two-dimensional road line, to obtain the three-dimensional road line.

In an embodiment, the moving terminal may calculate to obtain the laser point closest to a point on the two-dimensional road line by using a Euclidean distance.

The two-dimensional road line (or image) does not include the elevation information of the road, and the three-dimensional laser point includes the elevation information. Therefore, the three-dimensional laser point closest to the road line may be selected, and the elevation information of the selected three-dimensional laser point is used as the elevation information of the corresponding road line point. In this way, the three-dimensional road line including the elevation information may be obtained.

Figure 3:
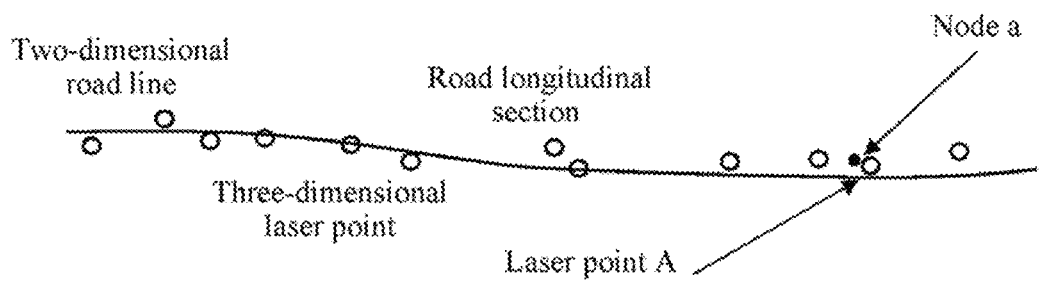
FIG. 3 is a schematic diagram of a longitudinal section of a two-dimensional road line and three-dimensional laser points according to an embodiment.

For example, as shown in FIG. 3, for a node (or point) a on a two-dimensional road line, a laser point closest to the node a may be determined by calculating a Euclidean distance. For example, the closest laser point is a laser point A, and then elevation information of the laser point A is used as elevation information of the node a. When laser points closest to all nodes on the two-dimensional road line are found, elevation information of the closest laser points is obtained, and the elevation information is used as elevation information of the corresponding nodes on the road line. In this way, a three-dimensional road line including the elevation information may be obtained.

In step S204, a plurality of nodes is selected from the three-dimensional road line as control points of a spline curve.

The spline curve is a curve obtained according to a set of given control points, and the shape of the curve is controlled by the control points.

In an embodiment, the moving terminal may randomly select the plurality of nodes from the three-dimensional road line as the control points of the spline curve. In addition, the moving terminal may alternatively select one node from the three-dimensional road line every other preset distance, thereby selecting the plurality of nodes from the three-dimensional road line and using the nodes as the control points of the spline curve.

In an embodiment, the moving terminal uses the plurality of selected nodes as initial control points, draws (or generates), according to the initial control points, an initial spline curve used for indicating a road elevation, and calculates a cost function. Variables of the cost function are a degree of fitting between a curve between every two initial control points and three-dimensional laser point cloud nearby, and a length of each section of curve. Then, the moving terminal continuously adjusts the quantity of the initial control points, and calculates the cost function once during each adjustment, to obtain a minimum value of the cost function; and uses the corresponding control points when the minimum value is obtained as control points of a first spline curve, so that the control points of the first spline curve are determined.

In step S206, a first spline curve indicating a road elevation is generated according to the selected control points.

The spline curve may be a B-spline curve, for example, a uniform B-spline curve or a non-uniform B-spline curve. An expression of the spline curve may be a three-dimensional third-order equation, and the expression includes a basis function. The road elevation is a distance from a point on the road to an absolute datum along a direction of a vertical line. An elevation difference is a difference between elevations of two points on the road.

For example, an expression of the first spline curve is $$P(z) = \sum_{i=0}^{3} P_i N_{i,3}(z),$$

where $N_{i,3}(z)$ is the basis function of the first spline curve, z is a variable of the basis function, and the basis function is derivable in a corresponding defined interval. $P_i$ is an $i^{th}$ control point of the spline curve.

In an embodiment, the moving terminal may connect the control points by using a curve according to a rule of the spline curve, to obtain the first spline curve used for indicating the road elevation.

In an embodiment, measurement manners of the road elevation may include: leveling, trigonometric leveling, global navigation satellite system (GNSS) elevation measurement, and physical elevation measurement. The leveling is to measure a level difference between ground points by using an instrument capable of providing a horizontal line of sight (for example, a level gauge).

In step S208, the first spline curve is converted into a second spline curve indicating a road gradient.

The road gradient may be a gradient of a transverse road slope, a gradient of a longitudinal road slope, and a gradient of a combination of the transverse road slope and the longitudinal road slope. Unless otherwise specified, in a subsequent embodiment, descriptions are provided by using an example in which the road gradient is the gradient of the longitudinal road slope.

The road gradient may be considered as a slope of an elevation curve. Therefore, the road gradient may be obtained in a manner of taking a derivative of the elevation curve. In an embodiment, step S208 may specifically include: determining a basis function in the first spline curve equation; and taking a derivative of the basis function in the first spline curve equation, and using a curve obtained after the derivation as the second spline curve indicating the road gradient.

If a change of the road elevation in an ascending direction of the gradient is a uniform change, the corresponding road gradient is a fixed value. If the change of the road elevation in the ascending direction of the gradient is a non-uniform change, the corresponding road gradient is a straight line or a curve.

For example, by deriving the following first spline curve P (z), the following second spline curve P' (z) used for indicating the road gradient may be obtained:

$$P(z)=(-s^3+3s^2+1)p_{0z}+(3s^3-6s^2+4)p_{1z}+(-3s^3+3s^2+3s+1)p_{2z}+s^3p_{3z}$$

$$P'(z)=(-3s^2+6s-3)p_{0z}+(9s^2-12s)p_{1z}+(-9s^2+6s+3)p_{2z}+3s^2p_{3z};$$

where $p_{0z}$, $p_{1z}$, $p_{2z}$, and $p_{3z}$ are elevation information of control points. s is a value between 0 and 1.

In step S210, location information is obtained.

The location information is a current location of the moving terminal. The location information may be latitude and longitude values, or may be coordinate values obtained after a terrestrial coordinate system is converted into a three-dimensional rectangular coordinate system corresponding to the three-dimensional road line.

In an embodiment, the moving terminal obtains the location information of the moving terminal through positioning by using a built-in global positioning system (GPS), a BeiDou Navigation Satellite System (BDS), a Galileo Satellite Navigation System, or the like. In addition, the moving terminal may further convert the location information obtained through positioning into location information in the three-dimensional rectangular coordinate system corresponding to the three-dimensional road line.

In another embodiment, the moving terminal obtains the location information of the moving terminal through positioning by using a mobile communications base station.

In step S212, a first road gradient is determined according to the location information and the second spline curve.

In an embodiment, when the location information is location information in the three-dimensional rectangular coordinate system corresponding to the three-dimensional road line, similarity comparison is performed between the location information and a node on the first spline curve, to obtain a node having a maximum similarity to the location information, and the node is substituted into an expression of the second spline curve, to obtain the first road gradient through calculation. s may be a similarity. If a Euclidean distance between the location information and a node on the spline curve is minimum, a similarity between the location information and the node is maximum.

In an embodiment, the moving terminal may determine a corresponding speed value according to the first road gradient, and adjust a driving speed of the moving terminal in a driving process according to the speed value. Different road gradients correspond to different speed values. For example, a relatively small road gradient value may correspond to a relatively large speed value, and a relatively large road gradient value may correspond to a relatively small speed value. In this way, safety problems caused by an excessively large driving speed on a road with a relatively large gradient may be avoided.

In the foregoing embodiment, the three-dimensional road line is formed by the two-dimensional road line and the laser point cloud data of the road, the plurality of nodes is selected from the three-dimensional road line as the control points to draw the first spline curve indicating the road elevation, and the first spline curve is converted into the second spline curve indicating the road gradient. Due to geometric continuity and local constraints of the spline curve itself, consistency and continuity of the road gradient data are ensured, thereby avoiding introduction of a horizontal error. Therefore, when the road gradient is determined according to the second spline curve, precision of the road gradient can be effectively improved.

Figure 4:
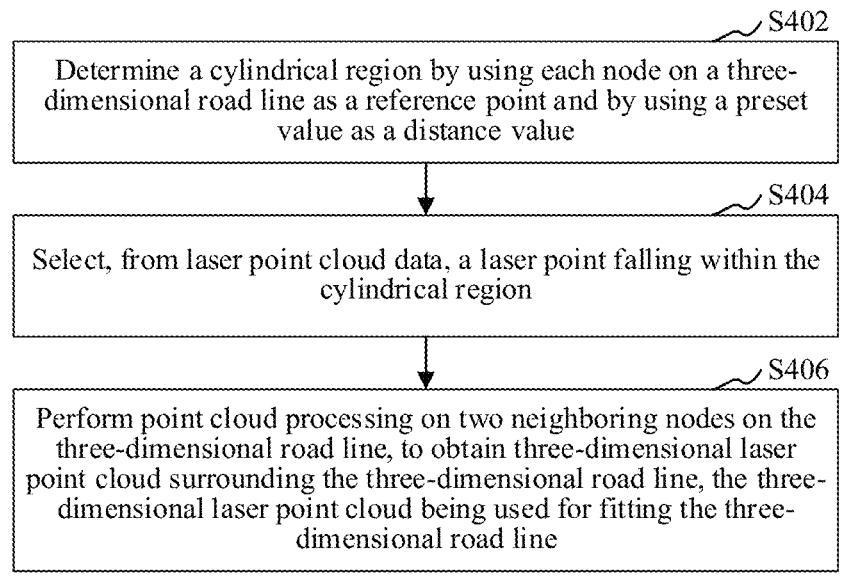
FIG. 4 is a schematic flowchart of steps of obtaining a three-dimensional laser point cloud surrounding a three-dimensional road line according to an embodiment.

In an embodiment, as shown in FIG. 4, before step S204, the method further includes the following.

In step S402, a cylindrical region is determined by using at least two nodes on the three-dimensional road line as reference points and by using a preset value as a radial distance value of the cylindrical region.

Each reference point may be a center point, for example, the center of a circle, the center of a polygon, or the like. The cylindrical region may be a region such as a cylinder, or a polygonal column.

In an embodiment, the moving terminal obtains points on the three-dimensional road line at equal intervals, connects every two neighboring points on the three-dimensional road line, and draws two circles by using the points at two ends as centers and by using a preset value as a radius, to obtain a cylinder including the two circles.

In an embodiment, the moving terminal obtains points on the three-dimensional road line at equal intervals, connects every two neighboring points on the three-dimensional road line, and draws two polygons by using the points at two ends as center points and by using a preset value as a shortest dimension of the polygon, to obtain a column including the two polygons.

In step S404, one or more laser points falling within the cylindrical region are selected from the laser point cloud data.

Some of laser points in the laser point cloud data are defined in the cylindrical region, and the moving terminal may keep the laser points falling within the cylindrical region.

In step S406, a three-dimensional laser point cloud is obtained surrounding the three-dimensional road line by using the selected one or more laser points, the three-dimensional laser point cloud being used for fitting the three-dimensional road line.

Figure 5:
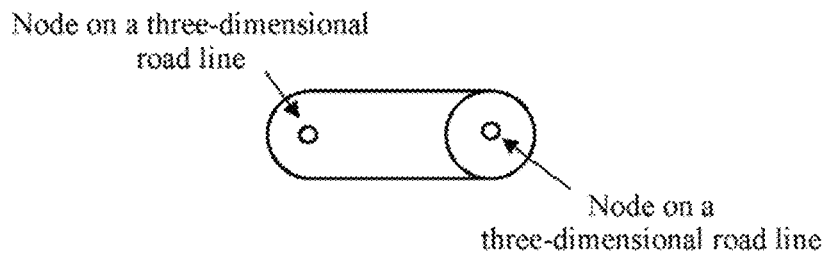
FIG. 5 is a schematic diagram of constructing a cylinder to obtain small-scale three-dimensional laser point cloud according to an embodiment.
Figure 6:
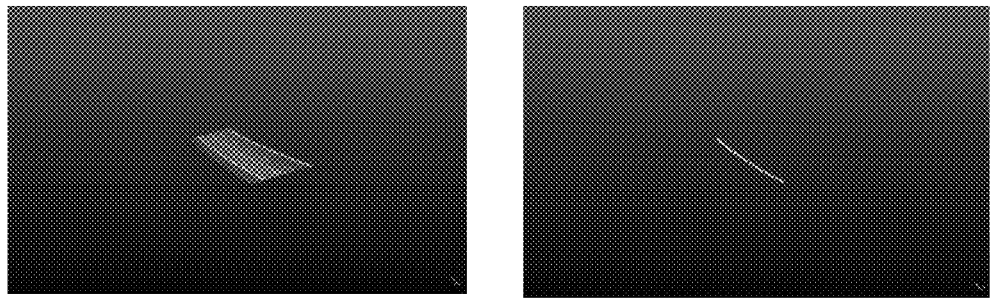
FIG. 6 is a schematic diagram of three-dimensional laser point cloud and small-scale three-dimensional laser point cloud according to an embodiment.

For example, as shown in FIG. 5, two nodes of the three-dimensional road line are connected and are used as two endpoints of a cylinder, a radius range is set, and points falling within the cylinder are kept, to obtain a small-scale three-dimensional laser point cloud, as shown in the right figure in FIG. 6. The left figure in FIG. 6 is laser point cloud related to a road in laser point cloud data, and the right figure in FIG. 6 is laser point cloud formed by laser points within a cylinder.

In the foregoing embodiment, the three-dimensional laser point whose distance from the road is shortest and satisfies the preset value is kept by using the cylindrical region, and a three-dimensional laser point with a longer distance from the road is filtered out, so that the kept three-dimensional laser point cloud can better fit the three-dimensional road line, thereby improving a fitting degree, and further improving accuracy of the road gradient.

Figure 7:
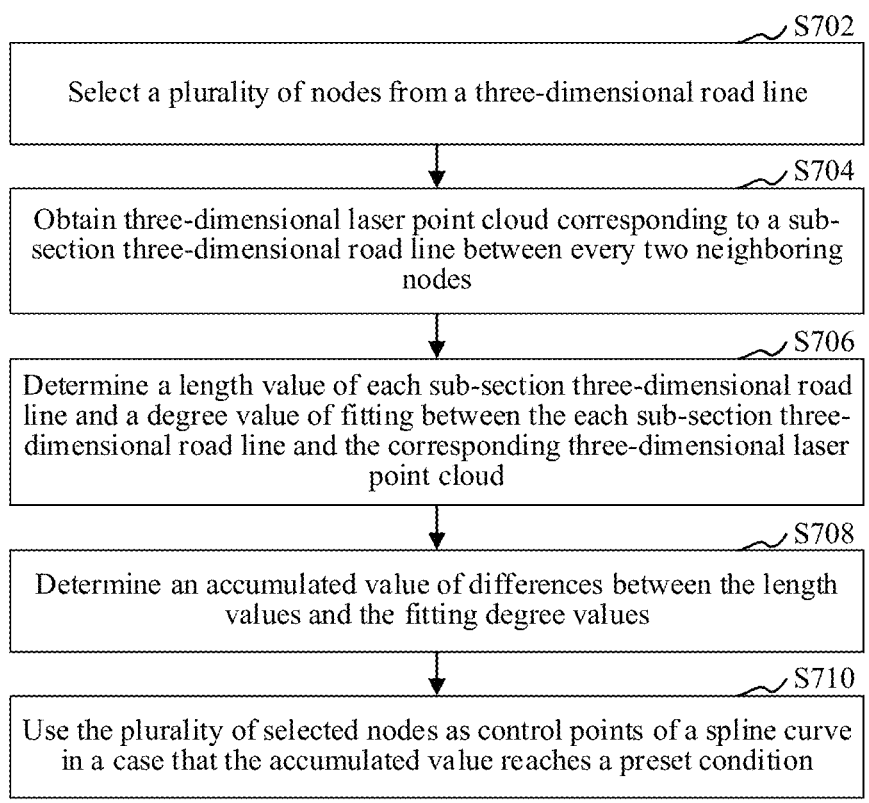
FIG. 7 is a schematic flowchart of steps of determining control points of a spline curve according to an embodiment.

In an embodiment, as shown in FIG. 7, step S204 may specifically include the following.

In step S702, a plurality of nodes is selected from the three-dimensional road line.

In an embodiment, the moving terminal may randomly select the plurality of nodes from the three-dimensional road line, or may alternatively select one node from the three-dimensional road line every other preset distance, thereby selecting the plurality of nodes from the three-dimensional road line.

In step S704, a three-dimensional laser point cloud corresponding to a sub-section of three-dimensional road line between every two neighboring nodes is obtained. For example, plural sub-sections of the three-dimensional road image are defined, each of the plural sub-sections being defined between two neighboring nodes of the selected plurality of nodes, and laser points of the three-dimensional laser point cloud are obtained, the obtained laser points corresponding to a respective sub-section of the three-dimensional road image.

The sub-section of the three-dimensional road line is a three-dimensional road line connecting two neighboring nodes. The three-dimensional laser point cloud corresponding to the sub-section three-dimensional road line is three-dimensional laser point cloud surrounding the sub-section three-dimensional road line.

In an embodiment, to obtain a corresponding three-dimensional laser point cloud, the moving terminal determines positions of nodes at two ends of the sub-section of the three-dimensional road line, and then captures the three-dimensional laser point cloud between the positions of the nodes at two ends.

In step S706, a length value of each sub-section of the three-dimensional road line and a degree value of fitting between the respective sub-section of the three-dimensional road line and the corresponding three-dimensional laser point cloud are determined.

In an embodiment, after the plurality of nodes is selected, the length value of each sub-section of the three-dimensional road line between the nodes is calculated, and a Euclidean distance between a node on the respective sub-section of the three-dimensional road line and a laser point in the corresponding three-dimensional laser point cloud is calculated. The fitting degree value is determined according to the Euclidean distance obtained through calculation. A smaller Euclidean distance indicates a larger fitting degree value, that is, a higher fitting degree. A larger Euclidean distance indicates a smaller fitting degree value, that is, a lower fitting degree. The fitting degree value may be a value between 0 and 1, where 1 may indicate 100% fitting.

In an embodiment, the moving terminal may also select a sub-section of the three-dimensional road line whose length value exceeds a preset threshold from the sub-sections of the three-dimensional road line, record the length value of the selected sub-section of the three-dimensional road line, and perform step S708 when the degree value of fitting between the sub-section of the three-dimensional road line and the corresponding three-dimensional laser point cloud is determined.

In step S708, an accumulated value of differences between the length values and the fitting degree values of the sub-sections of the three-dimensional road line (or image) is determined.

The selected nodes may be used as the control points of the initial spline curve. When the accumulated value is small enough, it may indicate that the B-spline curve drawn by using the plurality of selected nodes as the control points is the first spline curve.

In an embodiment, after calculating the length value of each sub-section of the three-dimensional road line and the degree value of fitting between the respective sub-section of the three-dimensional road line and the corresponding three-dimensional laser point cloud, the moving terminal adds the length values, to obtain a first sum. The moving terminal adds the fitting degree values, to obtain a second sum. The moving terminal calculates a difference between the first sum and the second sum, to obtain a difference. The obtained difference is the foregoing accumulated value.

In another embodiment, the moving terminal calculates a difference between each length value and the corresponding fitting degree value, and then adds results obtained through calculation of the differences, to obtain the accumulated value.

In step S710, the plurality of selected nodes are used as the control points of the spline curve in a case that the accumulated value satisfies a preset condition.

In an embodiment, the preset condition may be a condition of being less than or equal to a preset threshold, and the preset threshold may be small enough. When the accumulated value is less than or equal to the preset threshold, the plurality of nodes is used as the control points of the spline curve, and the B-spline curve drawn according to the control points is the first spline curve.

In the foregoing embodiment, when the spline curve is drawn by using the plurality of selected nodes as control nodes, the accumulated value of the differences between the length values of the sub-sections of the three-dimensional road lines and the degree values of fitting between the sub-sections of the three-dimensional road lines and the corresponding three-dimensional laser point cloud is first determined. Only when the accumulated value satisfies the preset condition, the plurality of selected nodes is used as the control points of the spline curve, and then the spline curve is drawn according to the control points, to obtain the first spline curve, thereby improving accuracy of the road gradient.

Figure 8:
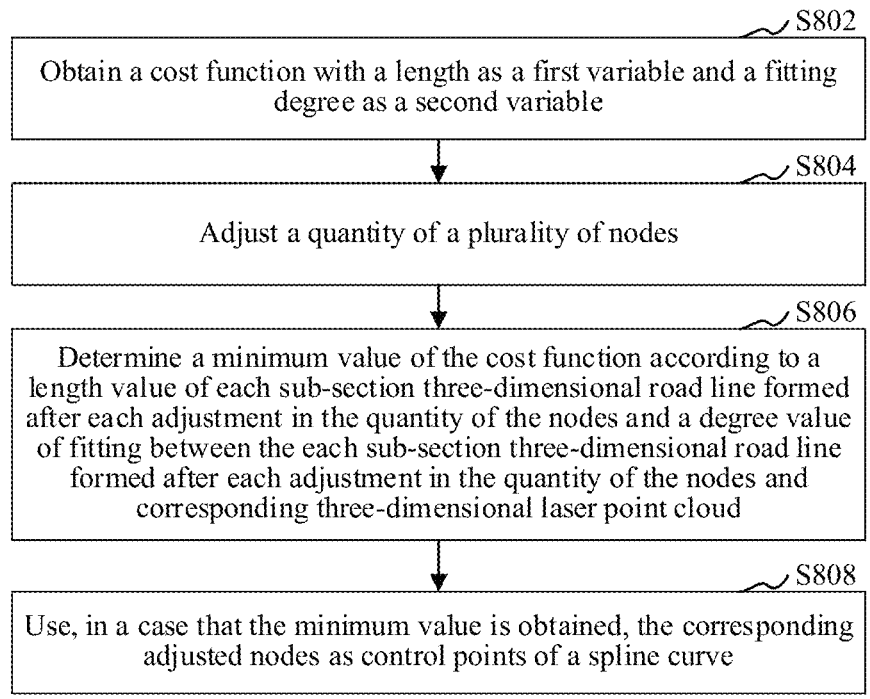
FIG. 8 is a schematic flowchart of steps of determining control points of a spline curve by using a cost function according to an embodiment.

In an embodiment, as shown in FIG. 8, the method may further include the following.

In step S802, a cost function is obtained with the length values of the sub-sections as a first variable and fitting degrees of the sub-sections as a second variable.

In an embodiment, the moving terminal establishes the cost function, where the first variable of the cost function is the lengths and the second variable is the fitting degrees.

For example, the cost function is shown as follows:

$$E=-\alpha \times \text{data\_fitting} + \varepsilon \times \#\text{length};$$

where data_fitting may be a Euclidean distance between a sub-section three-dimensional road line and three-dimensional laser point cloud, $\alpha$ may be a corresponding weight coefficient, and $\alpha \times$data_fitting is a degree of fitting between sub-sections of the three-dimensional road line between two nodes and three-dimensional laser point cloud surrounding each sub-section of the three-dimensional road line. #length may be a length value of each sub-section of the three-dimensional road line, or may be a length value of sub-sections of the three-dimensional road line whose length exceeds a preset threshold, or may be a quantity of sub-sections of the three-dimensional road lines whose length exceeds the preset threshold; e may be a corresponding weight coefficient, and $\varepsilon \times$#length is a length of each section of curve.

In step S804, a quantity of the plurality of nodes is adjusted.

In an embodiment, the moving terminal may randomly adjust the quantity of the plurality of selected nodes, or may adjust the quantity of the plurality of selected nodes each time according to a set quantity.

Specifically, step S804 may specifically include: increasing, by the moving terminal, the quantity of the plurality of selected nodes, or decreasing the quantity of the plurality of selected nodes. For increasing the quantity of the nodes, the moving terminal may randomly increase the quantity of the plurality of selected nodes, or may increase the quantity of the plurality of selected nodes each time according to a set quantity. In addition, for decreasing the quantity of the nodes, the moving terminal may randomly decrease the quantity of the plurality of selected nodes, or may decrease the quantity of the plurality of selected nodes each time according to a set quantity.

In step S806, a minimum value of the cost function is determined according to a length value of each sub-section of the three-dimensional road line formed after each adjustment in the quantity of the nodes and a degree value of fitting between the respective sub-section of the three-dimensional road line formed after each adjustment in the quantity of the nodes and corresponding three-dimensional laser point cloud.

In an embodiment, when the quantity of the plurality of selected nodes is increased, step S806 may specifically include: determining the length value of each sub-section of the three-dimensional road line formed after each increase in the quantity of the nodes and the degree value of fitting between the respective sub-section of the three-dimensional road line formed after each increase in the quantity of the nodes and the corresponding three-dimensional laser point cloud; and determining the minimum value of the cost function in a case that the cost function first decreases and then increases during successive steps of obtaining the cost function after increasing the quantity of the nodes. The added node is selected from the three-dimensional road line.

In the process of increasing the quantity of the nodes, if the calculated cost function decreases, the quantity of the nodes continues to be increased based on the original nodes until the cost function begins to increase, so that the minimum value may be obtained. The nodes corresponding to the obtained minimum value are the control points of the final spline curve, and the spline curve drawn according to the control points is the first spline curve. In the process of increasing the quantity of the nodes, if the calculated cost function increases, the operation of adding a node this time is received according to a preset probability, and the quantity of the nodes continues to be increased on this basis. If the cost function still increases, the operation of adding a node this time is rejected, the quantity of the nodes starts to be decreased, and the cost function is calculated.

In an embodiment, when the quantity of the plurality of selected nodes is decreased, step S806 may specifically include: determining the length value of each sub-section of the three-dimensional road line formed after each decrease in the quantity of the nodes and the degree value of fitting between the respective sub-section of the three-dimensional road line formed after each decrease in the quantity of the nodes and the corresponding three-dimensional laser point cloud; and determining the minimum value of the cost function in a case that the cost function first decreases and then increases during successive steps of obtaining the cost function after decreasing the quantity of the nodes.

In the process of decreasing the quantity of the nodes, if the calculated cost function decreases, the quantity of the nodes continues to be decreased based on the original nodes until the cost function begins to increase, so that the minimum value may be obtained. The nodes corresponding to the obtained minimum value are the control points of the final spline curve, and the spline curve drawn according to the control points is an optimal spline curve. In the process of decreasing the quantity of the nodes, if the calculated cost function increases, the operation of reducing a node this time is received according to a preset probability, and the quantity of the nodes continues to be decreased on this basis. If the cost function still increases, the operation of reducing a node this time is rejected, the quantity of the nodes starts to be increased, and the cost function is calculated.

In step S808, in a case that the minimum value is obtained, corresponding adjusted nodes are used as the control points of the spline curve.

For example, in a process of adjusting the quantity of the nodes, a value of the cost function is calculated. If the value of the cost function is minimum when the quantity of the nodes is adjusted to s, the s nodes are used as the control points of the spline curve, and a spline curve, that is, the first spline curve, is drawn according to the control points.

In the foregoing embodiment, before the spline curve is drawn by using the plurality of selected nodes as control nodes, the quantity of the nodes is adjusted, and then it is determined whether the cost function can obtain a minimum value. When the minimum value is obtained, it indicates that the corresponding adjusted nodes when the minimum value is obtained are optimal control points, and the spline curve is drawn according to the control nodes, to obtain the first spline curve, thereby improving accuracy of the road gradient.

Figure 9:
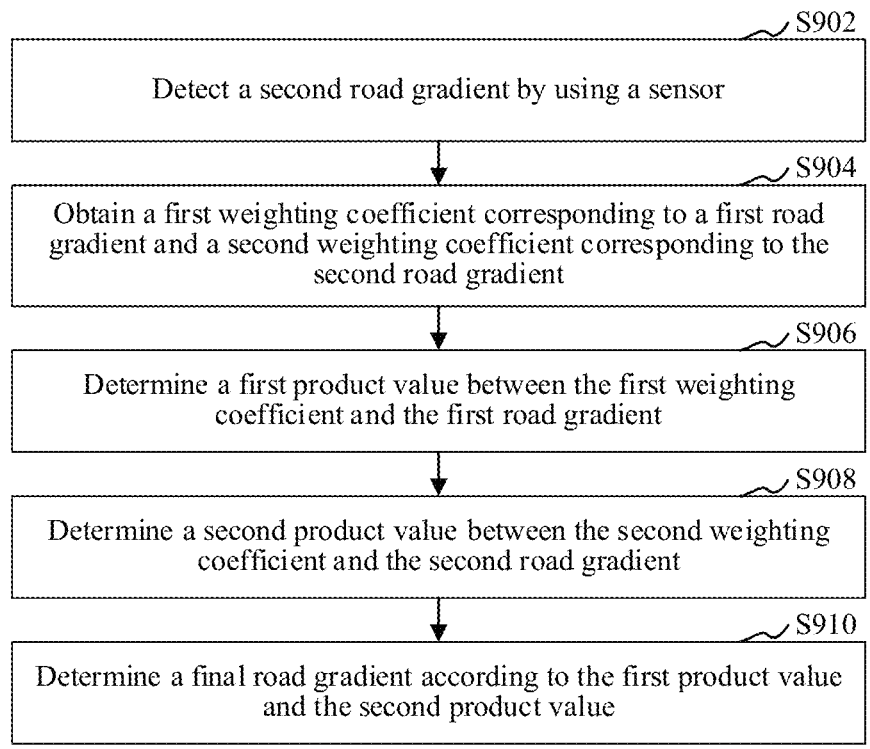
FIG. 9 is a schematic flowchart of steps of determining a final road gradient according to a first road gradient and a second road gradient according to an embodiment.

In an embodiment, as shown in FIG. 9, the method may further include the following.

In step S902, a second road gradient is detected by using a sensor.

The sensor may be a gradient sensor or an angle sensor mounted in the moving terminal, and a gradient value of a road may be detected by using the sensor.

In addition, the sensor may alternatively be a gradient sensor or an angle sensor mounted on two sides of a road, and a gradient value of a section of road may be detected by using the sensor. When the moving terminal passes the section of road, the sensor may send the measured gradient value to the moving terminal, and the moving terminal receives the gradient value. The sensors may be disposed on two sides of a gradient road, for example, disposed under an overpass.

The first road gradient obtained through the second spline curve used for indicating the road gradient may be integrated with the second road gradient detected by the sensor to determine a final road gradient, to reduce an error of the road gradient.

In step S904, a first weighting coefficient is obtained corresponding to the first road gradient and a second weighting coefficient is obtained corresponding to the second road gradient.

Both the first weighting coefficient and the second weighting coefficient are values between 0 and 1, and a sum obtained by adding the first weighting coefficient and the second weighting coefficient is 1.

In an embodiment, the moving terminal may determine the value of the first weighting coefficient and the value of the second weighting coefficient respectively according to a quantity of vehicles on the road or accuracy of a manner used for calculating the road gradient.

For example, when there are a relatively large quantity of vehicles on a road, there may be an error in the second road gradient detected by the moving terminal according to the sensor. In this case, the second weighting coefficient is less than the first weighting coefficient.

In step S906, a first product value between the first weighting coefficient and the first road gradient is determined.

In step S908, a second product value between the second weighting coefficient and the second road gradient is determined.

In step S910, a final road gradient according to the first product value and the second product value is determined.

In an embodiment, the moving terminal adds the first product value and the second product value, and determines a result of the summation as the final road gradient.

In an embodiment, the determined road gradient may be the first road gradient, or a road gradient obtained after the first road gradient and the second road gradient are combined. After the road gradient is determined, the method may further include: detecting a remaining slope length value of the moving terminal in a driving direction; determining a user field-of-view region according to the remaining slope length value and the determined road gradient; obtaining a speed value corresponding to the first road gradient and matching the user field-of-view region in a case that the user field-of-view region is smaller than a preset field-of-view region; and adjusting a driving speed of the moving terminal on the road according to the obtained speed value. When the user field-of-view region is not smaller than the preset field-of-view region, a speed value corresponding to the road gradient is obtained, and the driving speed of the moving terminal on the road is adjusted according to the obtained speed value without considering the user field-of-view region.

The remaining slope length value is a slope length from a current location of the moving terminal to a position where a gradient ahead is cut off in the driving direction. The user field-of-view region may be a region visible to a user, and may be measured by using a maximum visible distance of the user. The preset field-of-view region may be a preset region of a fixed size. When the user field-of-view region is not smaller than the preset field-of-view region, the region visible to the user is relatively large, a location of a vehicle ahead can be obtained, and the vehicle ahead does not affect driving of the user.

For example, when the moving terminal just completely enters an uphill or downhill road, since the moving terminal is parallel to the gradient road, a field-of-view region of a user in the moving terminal may be the entire gradient road. When approaching the end of the uphill or downhill road, the field-of-view region of the user may only be a remaining part of the gradient road, and consequently, the field-of-view region of the user is greatly reduced, and if there is a vehicle ahead, there may be a safety threat, and the driving speed needs to be reduced in this case. In addition, the moving terminal adjusts the driving speed according to the road gradient on a gradient road. Different road gradients may correspond to different driving speeds. A road with a relatively large road gradient corresponds to a relatively low driving speed.

In the foregoing embodiment, the first road gradient is combined with the second road gradient detected by the sensor, thereby reducing an error of the road gradient. The driving speed is determined according to the remaining slope length value and the road gradient, to prevent the moving terminal from colliding with a vehicle outside the field-of-view region due to an excessively high driving speed, thereby improving safety of driving.

In related road gradient determining solutions, the method mainly includes: selecting, directly along a two-dimensional road line, three-dimensional laser points closest to points on the two-dimensional road line from three-dimensional laser point cloud data, reading an elevation value of the obtained three-dimensional laser points, and then calculating an elevation difference and a horizontal distance between two three-dimensional laser points, to determine the road gradient.

In these related solutions, there are the following two problems:

On one hand, in the foregoing related solutions, quality of the acquired road data is not considered. For example, data noise introduced by an acquisition device, data missing caused by a scanning resolution, data missing caused by a scanning angle of a device, and spuriousness of elevation data caused by positioning precision are not considered. In addition, in an actual data acquisition process, data missing is caused by occlusion of other vehicles, and consequently, there are problems of unstable data and poor precision when the elevation is determined from the data.

On the other hand, when the elevation information is extracted by using the two-dimensional road line, the two-dimensional road line data inevitably introduces an error in a horizontal direction. Horizontal coordinates also cause instability, causing introduction of an error during elevation information extraction.

Figure 10:
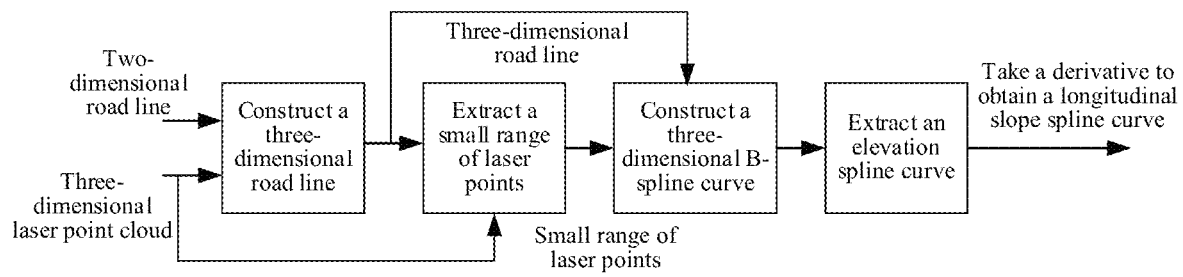
FIG. 10 is a schematic flowchart of a road gradient determining method according to another embodiment.

Therefore, to resolve the foregoing problems, an embodiment of the present disclosure provides a road gradient determining method. As shown in FIG. 10, specific content of the method may include the following.

(1) Find laser points closest to nodes on a two-dimensional road line, to form a three-dimensional road line.

For each node on the two-dimensional road line, a laser point having a closest Euclidean distance to the node is found from a three-dimensional laser point cloud. An elevation value of the found laser point is used as an elevation value of the corresponding node on the two-dimensional road line. In this way, the two-dimensional road line is converted into the three-dimensional road line.

(2) Extract all laser points in a relatively small neighborhood from the three-dimensional laser point cloud according to the three-dimensional road line.

Neighboring nodes on the three-dimensional road line are connected, the two connected nodes are used as two endpoints of a cylinder, and a radius range of a cross-section circle of the cylinder is set, to obtain a cylinder surrounding the three-dimensional road line between the two nodes. Points falling within the cylinder are kept, and point cloud processing is performed according to the endpoints of every two neighboring three-dimensional road lines, to form a small-scale three-dimensional point cloud surrounding the three-dimensional road line.

(3) Construct a three-dimensional third-order B-spline curve on the three-dimensional road line. By optimizing a quantity of control points and coordinates of the control points of the B-spline curve, a fitting error between the curve and the laser points is minimized, and the quantity of the control points is minimized.

A plurality of nodes is selected from the three-dimensional road line as knots of the B-spline curve, to determine the control points of the B-spline curve. An initial three-dimensional B-spline curve is constructed according to the determined control point, and the following cost function is calculated:

$$E = -\alpha \times \text{data\_fitting} + \varepsilon \times \text{\#length};$$

where the first term is a degree of fitting between a curve between every two knots and surrounding three-dimensional laser point cloud, and the second term is a length of each curve. Specifically, data_fitting may be a Euclidean distance between a curve between knots and three-dimensional laser point cloud, $\alpha$ may be a corresponding weight coefficient, and $\alpha \times \text{data\_fitting}$ is a fitting degree. #length may be a quantity of curves whose lengths exceed a preset threshold, and $\varepsilon$ may be a corresponding weight coefficient.

The cost function is minimized by randomly adjusting the number of knots. A manner of perturbation is to randomly add or randomly reduce the knots. The added knot is selected from the three-dimensional road line.

In the adjustment process, if the cost function decreases, such adjustment is accepted, that is, the number of knots continues to be adjusted. If the cost function increases, such perturbation is accepted or rejected according to a specific probability. The probability of acceptance gradually decreases with the quantity of iterations, that is, the knots continue to be perturbed according to a specific probability, and the probability of perturbing the knots gradually decreases with the quantity of iterations. After the iteration, a first spline curve is obtained.

(4) Extract an elevation spline curve in a traveling direction according to the fitted three-dimensional B-spline curve, and take a derivative of the elevation spline curve to obtain a longitudinal slope spline curve.

Along the fitted three-dimensional B-spline curve, the three-dimensional B-spline curve is discretized at fixed intervals, and an elevation value of points at each interval is taken to form the elevation curve.

An expression of each section of elevation spline curve is:

$$P(z)=(-s^3+3s^2+1)p_{0z}+(3s^3-6s^2+4)p_{1z}+(-3s^3+3s^2+3s+1)p_{2z}+s^3p_{3z}$$

An expression of the longitudinal slope spline curve is obtained by taking a derivative of the expression of the elevation spline curve:

$$P'(z)=(-3s^2+6s+3)p_{0z}+(9s^2-12s)p_{1z}+(-9s^2+6s+3)p_{2z}+3s^2p_{3z}$$

One road gradient may be determined by using the longitudinal slope spline curve. In a self-driving process, if a driving speed of self-driving needs to be adjusted according to the road gradient, a dynamic road gradient further needs to be detected by using a sensor. A weighted sum of the two road gradients is obtained, to obtain a final road gradient. Then, the driving speed of self-driving is adjusted according to the final obtained road gradient.

This solution can effectively resist data noise and missing data, and implement an industrial-level data precision requirement. An elevation value and a road gradient obtained by using this solution may be widely applied to self-driving and advanced auxiliary driving, to provide early warning on sight blocking caused by a gradient ahead and adjust the vehicle speed in a timely manner. On one hand, collision with a vehicle outside the field-of-view region due to an excessively high vehicle speed is prevented, thereby improving safety. On the other hand, comfort of driving on a road in a gradient region is ensured, and driving experience of a user is improved.

FIG. 2, FIG. 4, and FIG. 7 to FIG. 9 are schematic flowcharts of a road gradient determining method according to an embodiment. It is to be understood that, although the steps in the flowcharts of FIG. 2, FIG. 4, and FIG. 7 to FIG. 9 are sequentially displayed according to indication of arrows, the steps are not necessarily sequentially performed in the sequence indicated by the arrows. Unless explicitly specified in this specification, the steps are performed without any strict sequence limitation, and may be performed in another sequence. In addition, at least some steps in FIG. 2, FIG. 4, and FIG. 7 to FIG. 9 may include a plurality of sub-steps or a plurality of stages. The sub-steps or the stages are not necessarily performed at the same moment, and instead may be performed at different moments. The sub-steps or the stages are not necessarily performed sequentially, and instead may be performed in turn or alternately with another step or at least some of sub-steps or stages of another step.

Figure 11:
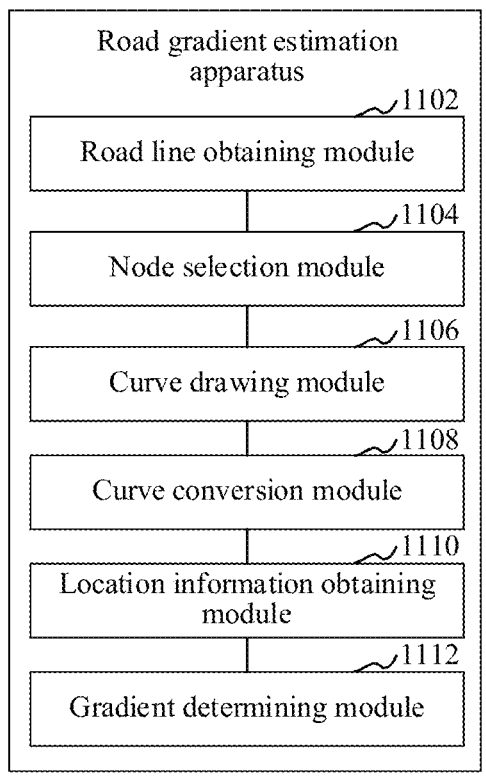
FIG. 11 is a structural block diagram of a road gradient determining apparatus according to an embodiment.

As shown in FIG. 11, in an embodiment, a road gradient determining apparatus is provided. The apparatus specifically includes a road line obtaining module 1102, a node selection module 1104, a curve drawing module 1106, a curve conversion module 1108, a location information obtaining module 1110, and a gradient determining module 1112.

The road line obtaining module 1102 is configured to obtain a three-dimensional road line formed by a two-dimensional road line and laser point cloud data of a road.

The node selection module 1104 is configured to select a plurality of nodes from the three-dimensional road line as control points of a spline curve.

The curve drawing module 1106 is configured to draw, according to the control points, a first spline curve indicating a road elevation.

The curve conversion module 1108 is configured to convert the first spline curve into a second spline curve indicating a road gradient.

The location information obtaining module 1110 is configured to obtain location information.

The gradient determining module 1112 is configured to determine a first road gradient according to the location information and the second spline curve.

In the foregoing embodiment, the three-dimensional road line is formed by the two-dimensional road line and the laser point cloud data of the road, the plurality of nodes is selected from the three-dimensional road line as the control points to draw the first spline curve used for indicating the road elevation, and the first spline curve is converted into the second spline curve used for indicating the road gradient. Due to geometric continuity and local constraints of the spline curve itself, consistency and continuity of the road gradient data are ensured, thereby avoiding introduction of a horizontal error. Therefore, when the road gradient is determined according to the second spline curve, accuracy of the road gradient can be effectively improved.

Figure 12:
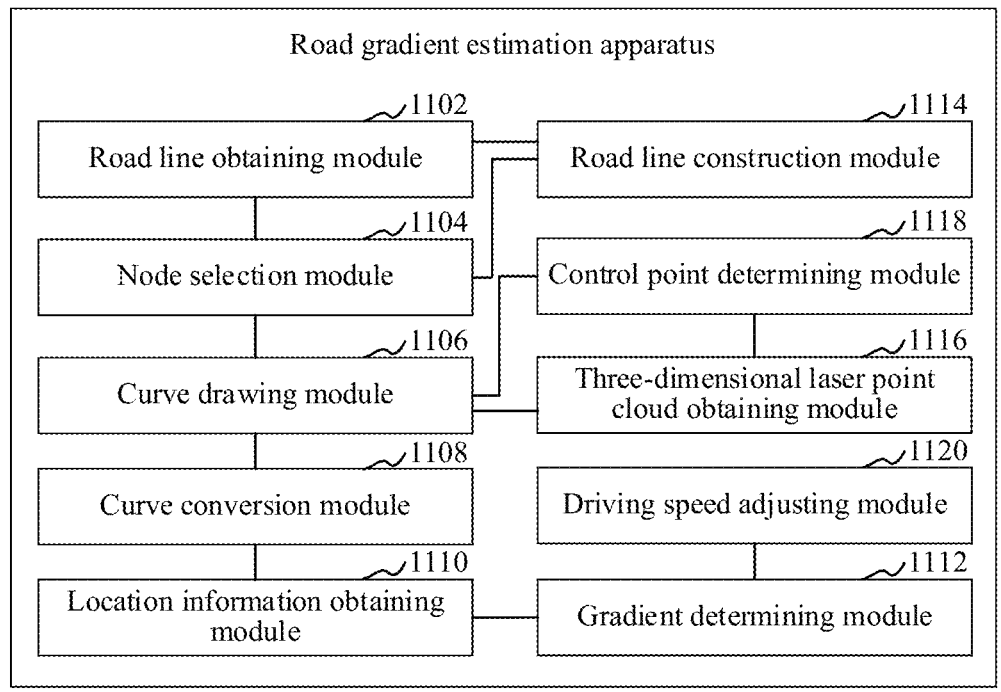
FIG. 12 is a structural block diagram of a road gradient determining apparatus according to another embodiment.

In an embodiment, as shown in FIG. 12, the apparatus further includes a road line construction module 1114.

The road line construction module 1114 is configured to obtain the two-dimensional road line and the laser point cloud data of the road; select, from the laser point cloud data, a laser point closest to a point on the two-dimensional road line; obtain an elevation value of the laser point; and use the elevation value as an elevation value of the corresponding point on the two-dimensional road line, to obtain the three-dimensional road line.

In an embodiment, as shown in FIG. 12, the apparatus further includes a three-dimensional laser point cloud obtaining module 1116.

The three-dimensional laser point cloud obtaining module 1116 is configured to determine, before the plurality of nodes is selected from the three-dimensional road line as the control points of the spline curve, a cylindrical region by using at least two nodes on the three-dimensional road line as reference points and by using a preset value as a radial distance value of the cylindrical region; select, from the laser point cloud data, one or more laser points falling within the cylindrical region; and obtaining a three-dimensional laser point cloud surrounding the three-dimensional road line by using the selected one or more laser points, the three-dimensional laser point cloud fitting the three-dimensional road line.

In the foregoing embodiment, the three-dimensional laser point whose distance is shortest from the three-dimensional road line (or image) and satisfies the preset value is kept by using the cylindrical region, and a three-dimensional laser point with a longer distance from the three-dimensional road line (or image) is filtered out, so that the kept three-dimensional laser point cloud can better fit the three-dimensional road line, thereby improving a fitting degree, and further improving accuracy of the road gradient.

In an embodiment, the node selection module 1104 is further configured to select a plurality of nodes from the three-dimensional road line; define plural sub-sections of the three-dimensional road image, each of the plural sub-sections being defined between two neighboring nodes of the selected plurality of nodes, and obtain laser points of the three-dimensional laser point cloud corresponding to a respective sub-section of the three-dimensional road line determine a length value of each sub-section of the three-dimensional road line and a degree value of fitting between the respective sub-section of the three-dimensional road line and the corresponding three-dimensional laser point cloud; determine an accumulated value of differences between the length values and the fitting degree values; and use the plurality of selected nodes as the control points of the spline curve in a case that the accumulated value satisfies a preset condition.

In the foregoing embodiment, when the spline curve is drawn by using the plurality of selected nodes as control nodes, the accumulated value of the differences between the length values of the sub-sections of the three-dimensional road line and the degree values of fitting between the sub-sections of the three-dimensional road line and the corresponding three-dimensional laser point cloud is first determined. Only when the accumulated value satisfies the preset condition, the plurality of selected nodes is used as the control points of the spline curve, and then the spline curve is drawn according to the control points, to obtain an optimal spline curve, thereby improving accuracy of the road gradient.

In an embodiment, as shown in FIG. 12, the apparatus further includes a control point determining module 1118.

The control point determining module 1118 is configured to obtain a cost function with a length as a first variable and a fitting degree as a second variable; adjust a quantity of the plurality of selected nodes; determine a minimum value of the cost function according to a length value of each sub-section of the three-dimensional road line formed after each adjustment in the quantity of the nodes and a degree value of fitting between the respective sub-section three-dimensional road line formed after each adjustment in the quantity of the nodes and the three-dimensional laser point cloud; and use, in a case that the minimum value is obtained, corresponding adjusted nodes as the control points of the spline curve.

In an embodiment, the control point determining module 1118 is further configured to increase the quantity of the plurality of nodes; determine the length value of each sub-section of the three-dimensional road line formed after each increase in the quantity of the nodes and the degree value of fitting between the respective sub-section of the three-dimensional road line formed after each increase in the quantity of the nodes and the corresponding three-dimensional laser point cloud; and determine the minimum value of the cost function in a case that the cost function first decreases and then increases during successive steps of obtaining the cost function after increasing the quantity of the nodes.

In an embodiment, the control point determining module 1118 is further configured to decrease the quantity of the plurality of nodes; determine the length value of each sub-section of the three-dimensional road line formed after each decrease in the quantity of the nodes and the degree value of fitting between the respective sub-section of the three-dimensional road line formed after each decrease in the quantity of the nodes and the corresponding three-dimensional laser point cloud; and determine the minimum value of the cost function in a case that the cost function first decreases and then increases during successive steps of obtaining the cost function after decreasing the quantity of the nodes.

In the foregoing embodiment, before the spline curve is drawn by using the plurality of selected nodes as control nodes, the quantity of the nodes is adjusted, and then it is determined whether the cost function can obtain a minimum value. When the minimum value is obtained, it indicates that the corresponding adjusted nodes used in obtaining the minimum value are optimal control points, and the spline curve is drawn according to the control nodes, to obtain the optimal spline curve, thereby improving accuracy of the road gradient.

In an embodiment, the curve conversion module 1108 is further configured to determine a basis function in the first spline curve equation; and take a derivative of the basis function in the first spline curve equation, and use a curve obtained after the derivation as the second spline curve used for indicating the road gradient.

In an embodiment, the gradient determining module 1112 is further configured to detect a second road gradient by using a sensor in a moving terminal; obtain a first weighting coefficient corresponding to the first road gradient and a second weighting coefficient corresponding to the second road gradient; determine a first product value between the first weighting coefficient and the first road gradient; determine a second product value between the second weighting coefficient and the second road gradient; and determine a final road gradient according to the first product value and the second product value.

In an embodiment, as shown in FIG. 12, the apparatus may further include a driving speed adjusting module 1120.

The driving speed adjusting module 1120 is configured to detect a remaining slope length value of the moving terminal in a driving direction; determine a user field-of-view region according to the remaining slope length value and the determined road gradient; obtain a speed value corresponding to the first road gradient and matching the user field-of-view region in a case that the user field-of-view region is smaller than a preset field-of-view region; and adjust a driving speed of the moving terminal on the road according to the obtained speed value.

In the foregoing embodiment, the first road gradient is combined with the second road gradient detected by the sensor, thereby reducing an error of the road gradient. The driving speed is determined according to the remaining slope length value and the road gradient, to prevent the moving terminal from colliding with a vehicle outside the field-of-view region due to an excessively high driving speed, thereby improving safety of driving.

The foregoing road gradient determining apparatus may be implemented in a form of a computer program, and the computer program being stored on a non-transitory computer-readable medium and may run on a moving terminal (or a server). Using the moving terminal as an example, a non-transitory storage medium of the moving terminal may store program modules forming the road gradient determining apparatus, for example, the road line obtaining module 1102, the node selection module 1104, the curve drawing module 1106, the curve conversion module 1108, the location information obtaining module 1110, and the gradient determining module 1112 shown in FIG. 11. The computer program formed by the program modules, when executed by a processor (processing circuitry), causes the processor to perform the steps of the road gradient determining method in the embodiments of this application.

Figure 13:
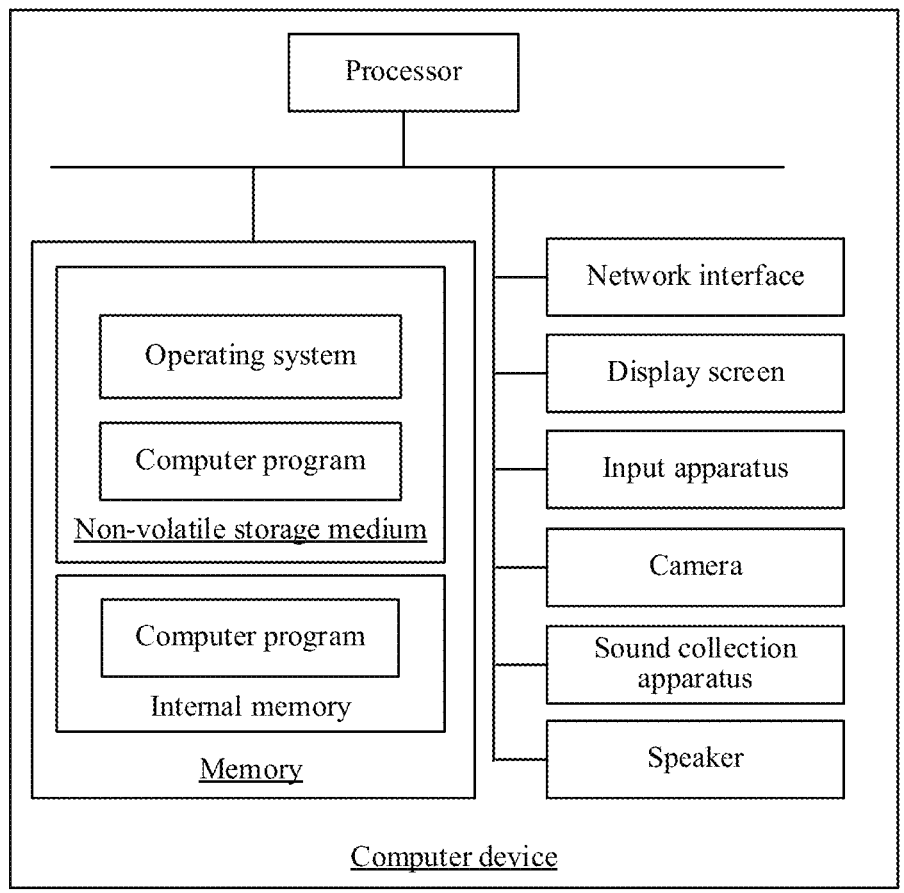
FIG. 13 is a structural block diagram of a computer device according to an embodiment.

FIG. 13 is a diagram of an internal structure of a computer device according to an embodiment. The computer device may be specifically the moving terminal in FIG. 1. As shown in FIG. 13, the computer device includes a processor, a memory, a network interface, an input apparatus, and a display screen that are connected by using a system bus. The memory includes a non-volatile storage medium and an internal memory. The non-volatile and non-transitory storage medium of the computer device stores an operating system, and may further store a computer program. The computer program, when executed by the processor, may cause the processor to implement the road gradient determining method. The internal memory may also store a computer program. The computer program, when executed by the processor, may cause the processor to perform the road gradient determining method. The display screen of the computer device may be a liquid crystal display screen or an electronic ink display screen. The input apparatus of the computer device may be a touch layer covering the display screen, or may be a key, a trackball, or a touchpad disposed on a housing of the computer device, or may be an external keyboard, touchpad, mouse, or the like.

A person skilled in the art may understand that the structure shown in FIG. 13 is only a block diagram of a partial structure related to the solution of this application, and does not constitute a limitation to the computer device to which the solution of this application is applied. Specifically, the computer device may include more or fewer components than those shown in FIG. 13, or some components may be combined, or a different component deployment may be used.

The computer device may be a moving terminal (or a server), or may be a device on the moving terminal (or the server) that is configured to perform the road gradient determining method.

In an embodiment, the apparatus 11 provided in this application may be implemented in a form of a computer program, and the computer program may run on the computer device shown in FIG. 13. The non-transitory memory of the computer device may store program modules forming the road gradient determining apparatus, for example, the road line obtaining module 1102, the node selection module 1104, the curve drawing module 1106, the curve conversion module 1108, the location information obtaining module 1110, and the gradient determining module 1112 shown in FIG. 11. The computer program formed by the program modules causes the processor to perform the steps of the road gradient determining method in the embodiments of this application described in this specification.

For example, the computer device shown in FIG. 13 may perform S202 by using the road line obtaining module 1102 in the road gradient determining apparatus shown in FIG. 11. The computer device may perform S204 by using the node selection module 1104. The computer device may perform S206 by using the curve drawing module 1106. The computer device may perform S208 by using the curve conversion module 1108. The computer device may perform S210 by using the location information obtaining module 1110. The computer device may perform S212 by using the gradient determining module 1112.

In an embodiment, a computer device is provided, including a non-transitory memory and a processor, the memory storing a computer program, the computer program, when executed by the processor, causing the processor to perform the following operations: obtaining a three-dimensional road line (or image) formed by a two-dimensional road line (or image) and laser point cloud data of a road; selecting a plurality of nodes from the three-dimensional road line as control points of a spline curve; drawing (or generating), according to the control points, a first spline curve indicating a road elevation; converting the first spline curve into a second spline curve indicating a road gradient; and obtaining location information, and determining a first road gradient according to the location information and the second spline curve.

In another embodiment, the computer program, when executed by the processor, causes the processor to perform the following operations: obtaining the two-dimensional road line and the laser point cloud data of the road; selecting, from the laser point cloud data, a laser point closest to a node (or point) on the two-dimensional road line; obtaining an elevation value of the selected laser point; and using the elevation value as an elevation value of the corresponding node on the two-dimensional road line, to obtain the three-dimensional road line.

In another embodiment, the computer program, when executed by the processor, causes the processor to perform the following operations: determining a cylindrical region by using at least two nodes on the three-dimensional road line as reference points and by using a preset value as a radial distance value of the cylindrical region; selecting, from the laser point cloud data, one or more laser points falling within the cylindrical region; and obtaining a three-dimensional laser point cloud surrounding the three-dimensional road line by using the selected one or more laser points, the three-dimensional laser point cloud fitting the three-dimensional road line.

In another embodiment, the computer program, when executed by the processor, causes the processor to perform the following operations: selecting a plurality of nodes from the three-dimensional road line; defining plural sub-sections of the three-dimensional road image, each of the plural sub-sections being defined between two neighboring nodes of the selected plurality of nodes, and obtaining laser points of the three-dimensional laser point cloud, the obtained laser points corresponding to a respective sub-section of the three-dimensional road line; determining a length value of each sub-section of the three-dimensional road line and a degree value of fitting between the respective sub-section of the three-dimensional road line and the corresponding laser points of the three-dimensional laser point cloud; determining an accumulated value of differences between the length values and the fitting degree values; and using the plurality of selected nodes as the control points of the spline curve in a case that the accumulated value satisfies a preset condition.

In another embodiment, the computer program, when executed by the processor, causes the processor to perform the following operations: obtaining a cost function with the length values of the plural sub-sections as a first variable and fitting degree values of the plural sub-sections as a second variable; adjusting a quantity of the plurality of selected nodes; repeating the obtaining the cost function and the adjusting to determine a minimum value of the cost function; and using, in a case that the minimum value is obtained, the adjusted quantity of the plurality of selected nodes resulting in the minimum value of the cost function as the control points of the spline curve.

In another embodiment, the computer program, when executed by the processor, causes the processor to perform the following operations: increasing the quantity of the plurality of nodes; and the determining a minimum value of the cost function includes: determining the length value of each sub-section of the three-dimensional road line formed after each increase in the quantity of the nodes and the degree value of fitting between the respective sub-section of the three-dimensional road line formed after each increase in the quantity of the nodes and the corresponding laser points of the three-dimensional laser point cloud; and determining the minimum value of the cost function in a case that the cost function first decreases and then increases during successive steps of obtaining the cost function after increasing the quantity of the nodes.

In another embodiment, the computer program, when executed by the processor, causes the processor to perform the following operations: decreasing the quantity of the plurality of nodes; and the determining a minimum value of the cost function includes: determining the length value of each sub-section of the three-dimensional road line formed after each decrease in the quantity of the nodes and the degree value of fitting between the respective sub-section of the three-dimensional road line formed after each decrease in the quantity of the nodes and the corresponding laser points of the three-dimensional laser point cloud; and determining the minimum value of the cost function in a case that the cost function first decreases and then increases during successive steps of obtaining the cost function after decreasing the quantity of the nodes.

In another embodiment, the computer program, when executed by the processor, causes the processor to perform the following operations: determining a basis function in the first spline curve equation; and determining a derivative of the basis function in the first spline curve equation, and using a curve obtained after the derivation as the second spline curve used for indicating the road gradient.

In another embodiment, the computer program, when executed by the processor, causes the processor to perform the following operations: detecting a second road gradient of the two-dimensional road line by using a sensor; obtaining a first weighting coefficient corresponding to the first road gradient and a second weighting coefficient corresponding to the second road gradient; determining a first product value between the first weighting coefficient and the first road gradient; determining a second product value between the second weighting coefficient and the second road gradient; and determining a final road gradient according to the first product value and the second product value.

In another embodiment, the computer program, when executed by the processor, causes the processor to perform the following operations: detecting a remaining slope length value of a moving terminal in a driving direction; determining a user field-of-view region according to the remaining slope length value and the determined road gradient; obtaining a speed value corresponding to the first road gradient and matching the user field-of-view region in a case that the user field-of-view region is smaller than a preset field-of-view region; and adjusting a driving speed of the moving terminal on the road according to the obtained speed value.

In an embodiment, a computer-readable storage medium is provided, storing a computer program, the computer program, when executed by a processor, causing the processor to perform the following operations: obtaining a three-dimensional road line formed by a two-dimensional road line and laser point cloud data of a road; selecting a plurality of nodes from the three-dimensional road line as control points of a spline curve; drawing, according to the control points, a first spline curve used for indicating a road elevation; converting the first spline curve into a second spline curve used for indicating a road gradient; and obtaining location information, and determining a first road gradient according to the location information and the second spline curve.

In another embodiment, the computer program, when executed by the processor, causes the processor to perform the following operations: obtaining the two-dimensional road line and the laser point cloud data of the road; selecting, from the laser point cloud data, a laser point closest to each node on the two-dimensional road line; obtaining an elevation value of the selected laser point; and using the elevation value as an elevation value of the corresponding node on the two-dimensional road line, to obtain the three-dimensional road line.

In another embodiment, the computer program, when executed by the processor, causes the processor to perform the following operations: determining a cylindrical region by using each node on the three-dimensional road line as a reference point and by using a preset value as a distance value; selecting, from the laser point cloud data, a laser point falling within the cylindrical region; and performing point cloud processing on two neighboring nodes on the three-dimensional road line, to obtain three-dimensional laser point cloud surrounding the three-dimensional road line, the three-dimensional laser point cloud being used for fitting the three-dimensional road line.

In another embodiment, the computer program, when executed by the processor, causes the processor to perform the following operations: selecting a plurality of nodes from the three-dimensional road line; obtaining three-dimensional laser point cloud corresponding to a sub-section three-dimensional road line between every two neighboring nodes; determining a length value of each sub-section three-dimensional road line and a degree value of fitting between the each sub-section three-dimensional road line and the corresponding three-dimensional laser point cloud; determining an accumulated value of differences between the length values and the fitting degree values; and using the plurality of selected nodes as the control points of the spline curve in a case that the accumulated value satisfies a preset condition.

In another embodiment, the computer program, when executed by the processor, causes the processor to perform the following operations: obtaining a cost function with a length as a first variable and a fitting degree as a second variable; adjusting a quantity of the plurality of selected nodes; determining a minimum value of the cost function according to a length value of each sub-section three-dimensional road line formed after each adjustment in the quantity of the nodes and a degree value of fitting between the each sub-section three-dimensional road line formed after each adjustment in the quantity of the nodes and corresponding three-dimensional laser point cloud; and using, in a case that the minimum value is obtained, the corresponding nodes as the control points of the spline curve.

In another embodiment, the computer program, when executed by the processor, causes the processor to perform the following operations: increasing the quantity of the plurality of nodes; and the determining a minimum value of the cost function according to a length value of each sub-section three-dimensional road line formed after each adjustment in the quantity of the nodes and a degree value of fitting between the each sub-section three-dimensional road line formed after each adjustment in the quantity of the nodes and corresponding three-dimensional laser point cloud includes: determining the length value of each sub-section three-dimensional road line formed after each increase in the quantity of the nodes and the degree value of fitting between the each sub-section three-dimensional road line formed after each increase in the quantity of the nodes and the corresponding three-dimensional laser point cloud; and determining the minimum value of the cost function in a case that the cost function first decreases and then increases during successive substitution of the length value and the corresponding fitting degree value that are determined by increasing the quantity of the nodes.

In another embodiment, the computer program, when executed by the processor, causes the processor to perform the following operations: decreasing the quantity of the plurality of nodes; and the determining a minimum value of the cost function according to a length value of each sub-section three-dimensional road line formed after each adjustment in the quantity of the nodes and a degree value of fitting between the each sub-section three-dimensional road line formed after each adjustment in the quantity of the nodes and corresponding three-dimensional laser point cloud includes: determining the length value of each sub-section three-dimensional road line formed after each decrease in the quantity of the nodes and the degree value of fitting between the each sub-section three-dimensional road line formed after each decrease in the quantity of the nodes and the corresponding three-dimensional laser point cloud; and determining the minimum value of the cost function in a case that the cost function first decreases and then increases during successive substitution of the length value and the corresponding fitting degree value that are determined by decreasing the quantity of the nodes.

In another embodiment, the computer program, when executed by the processor, causes the processor to perform the following operations: determining a basis function in the first spline curve equation; and taking a derivative of the basis function in the first spline curve equation, and using a curve obtained after the derivation as the second spline curve used for indicating the road gradient.

In another embodiment, the computer program, when executed by the processor, causes the processor to perform the following operations: detecting a second road gradient of the two-dimensional road line by using a sensor; obtaining a first weighting coefficient corresponding to the first road gradient and a second weighting coefficient corresponding to the second road gradient; determining a first product value between the first weighting coefficient and the first road gradient; determining a second product value between the second weighting coefficient and the second road gradient; and determining a final road gradient according to the first product value and the second product value.

In another embodiment, the computer program, when executed by the processor, causes the processor to perform the following operations: detecting a remaining slope length value of a moving terminal in a driving direction; determining a user field-of-view region according to the remaining slope length value and the determined road gradient; obtaining a speed value corresponding to the first road gradient and matching the user field-of-view region in a case that the user field-of-view region is smaller than a preset field-of-view region; and adjusting a driving speed of the moving terminal on the road according to the obtained speed value.

A person of ordinary skill in the art may understand that all or some of the procedures of the method in the foregoing embodiments may be implemented by a computer program instructing relevant hardware. The program may be stored in a non-volatile and non-transitory computer-readable storage medium. When the program is executed, the procedures of the foregoing method embodiments may be implemented. Any reference to a memory, a storage, a database, or another medium used in the embodiments provided in this application may include a non-volatile and/or volatile memory. The non-volatile memory may include a read-only memory (ROM), a programmable ROM (PROM), an electrically programmable ROM (EPROM), an electrically erasable programmable ROM (EEPROM), or a flash memory. The volatile memory may include a random access memory (RAM) or an external cache. As an illustration instead of a limitation, the RAM is available in a plurality of forms, such as a static RAM (SRAM), a dynamic RAM (DRAM), a synchronous DRAM (SDRAM), a double data rate SDRAM (DDRSDRAM), an enhanced SDRAM (ESDRAM), a synchronous link (Synchlink) DRAM (SLDRAM), a Rambus direct RAM (RDRAM), a direct Rambus dynamic RAM (DRDRAM), and a Rambus dynamic RAM (RDRAM).

The technical features in the foregoing embodiments may be implemented in various combinations. For concise description, not all possible combinations of the technical features in the embodiment are described. However, the combinations of the technical features are to be considered as falling within the scope recorded in this specification provided that they do not conflict with each other.

The foregoing embodiments only describe several implementations of this application, and are specifically described in detail, but are to be not construed as limitation to the patent scope of this application. A person of ordinary skill in the art may further make variations and improvements without departing from the ideas of this application, which shall all fall within the protection scope of this application. Therefore, the protection scope of this application shall be subject to the protection scope of the appended claims.

What is claimed is:

1. A road gradient determining method, applied to a computer device, the method comprising:
    obtaining, by processing circuitry of the computer device, a three-dimensional road image formed by a two-dimensional road image of a road and laser point cloud data of the road;
    selecting, by the processing circuitry of the computer device, a plurality of nodes from the three-dimensional road image as control points, wherein the control points are selected based on an accumulated value of differences between (i) lengths of sub-sections of the three-dimensional road image between neighboring nodes of the selected plurality of nodes and (ii) fitting degree values of laser points of respective three-dimensional laser point clouds corresponding to each sub-section of the three-dimensional road image;
    generating, by the processing circuitry of the computer device, according to the control points, a first spline curve indicating a road elevation;
    converting, by the processing circuitry of the computer device, the first spline curve into a second spline curve indicating a road gradient;
    obtaining, by the processing circuitry of the computer device, location information; and
    determining, by the processing circuitry of the computer device, a first road gradient according to the location information and the second spline curve.

2. The method according to claim 1, wherein the obtaining the three-dimensional road image comprises:
    obtaining the two-dimensional road image and the laser point cloud data of the road;
    selecting, from the laser point cloud data, a laser point closest to a point on the two-dimensional road image;
    obtaining an elevation value of the selected laser point; and
    using the elevation value as an elevation value of the point on the two-dimensional road image, to obtain the three-dimensional road image.

3. The method according to claim 1, wherein before the selecting, the method further comprises:
    determining a cylindrical region by using at least two nodes in the three-dimensional road image as reference points and by using a preset value as a radial distance value of the cylindrical region;
    selecting, from the laser point cloud data, one or more laser points falling within the cylindrical region; and obtaining a three-dimensional laser point cloud surrounding the three-dimensional road image by using the selected one or more laser points, the three-dimensional laser point cloud fitting the three-dimensional road image.

4. The method according to claim 3, wherein the selecting the plurality of nodes comprises:
selecting a plurality of nodes from the three-dimensional road image;
defining plural sub-sections of the three-dimensional road image, each of the plural sub-sections being defined between two neighboring nodes of the selected plurality of nodes, and obtaining laser points of a three-dimensional laser point cloud corresponding to each respective sub-section of the three-dimensional road image;
determining a length value of each sub-section of the three-dimensional road image and a degree value of fitting between the respective sub-section of the three-dimensional road image and the laser points of the three-dimensional laser point cloud corresponding to the respective sub-section of the three-dimensional road image;
determining an accumulated value of differences between the length values and the fitting degree values of the plural sub-sections of the three-dimensional road image; and
using the plurality of selected nodes as the control points of the first spline curve in a case that the accumulated value satisfies a condition.

5. The method according to claim 4, further comprising:
obtaining a cost function with the length values of the plural sub-sections as a first variable and the fitting degree values of the plural sub-sections as a second variable;
adjusting a quantity of the plurality of selected nodes;
repeating the obtaining the cost function and the adjusting to determine a minimum value of the cost function; and
using, in a case that the minimum value is determined, the adjusted quantity of the plurality of selected nodes resulting in the minimum value of the cost function as the control points of the first spline curve.

6. The method according to claim 5, wherein
the adjusting comprises increasing the quantity of the plurality of nodes; and
the determining the minimum value of the cost function comprises:
determining the length value of each sub-section of the three-dimensional road image formed after each increase in the quantity of the plurality of nodes and the degree value of fitting between the respective sub-section of the three-dimensional road image formed after each increase in the quantity of the plurality of nodes and the laser points of the three-dimensional laser point cloud corresponding to the respective sub-section of the three-dimensional road image; and
determining the minimum value of the cost function in a case that the cost function first decreases and then increases during successive steps of obtaining the cost function after increasing the quantity of the plurality of nodes.

7. The method according to claim 5, wherein
the adjusting comprises decreasing the quantity of the plurality of nodes; and
the determining the minimum value of the cost function comprises:
determining the length value of each sub-section of the three-dimensional road image formed after each decrease in the quantity of the plurality of nodes and the degree value of fitting between the respective sub-section of the three-dimensional road image formed after each decrease in the quantity of the plurality of nodes and the laser points of the three-dimensional laser point cloud corresponding to the respective sub-section of the three-dimensional road image; and
determining the minimum value of the cost function in a case that the cost function first decreases and then increases during successive steps of obtaining the cost function after decreasing the quantity of the plurality of nodes.

8. The method according to claim 1, wherein the converting comprises:
determining a basis function in an equation of the first spline curve; and
determining a derivative of the basis function in the equation of the first spline curve, and using a curve obtained after the derivation as the second spline curve indicating the road gradient.

9. The method according to claim 1, further comprising:
detecting a second road gradient of the two-dimensional road image by using a sensor;
obtaining a first weighting coefficient corresponding to the first road gradient and a second weighting coefficient corresponding to the second road gradient;
determining a first product value between the first weighting coefficient and the first road gradient;
determining a second product value between the second weighting coefficient and the second road gradient; and
determining a final road gradient according to the first product value and the second product value.

10. The method according to claim 1, further comprising:
detecting a remaining slope length value of a moving terminal in a driving direction;
determining a user field-of-view region according to the remaining slope length value and the determined first road gradient;
obtaining a speed value corresponding to the first road gradient and matching the user field-of-view region in a case that the user field-of-view region is smaller than a preset field-of-view region; and
adjusting a driving speed of the moving terminal on the road according to the obtained speed value.

11. A road gradient determining apparatus, comprising:
processing circuitry configured to
obtain a three-dimensional road image formed by a two-dimensional road image of a road and laser point cloud data of the road;
select a plurality of nodes from the three-dimensional road image as control points, wherein the control points are selected based on an accumulated value of differences between (i) lengths of sub-sections of the three-dimensional road image between neighboring nodes of the selected plurality of nodes and (ii) fitting degree values of laser points of respective three-dimensional laser point clouds corresponding to each sub-section of the three-dimensional road image;
generate, according to the control points, a first spline curve indicating a road elevation;
convert the first spline curve into a second spline curve indicating a road gradient;
obtain location information; and
determine a first road gradient according to the location information and the second spline curve.

12. The apparatus according to claim 11, wherein the processing circuitry is further configured to:
   obtain the two-dimensional road image and the laser point cloud data of the road;
   select, from the laser point cloud data, a laser point closest to a point on the two-dimensional road image;
   obtain an elevation value of the selected laser point; and
   use the elevation value as an elevation value of the point on the two-dimensional road image, to obtain the three-dimensional road image.

13. The apparatus according to claim 11, wherein the processing circuitry is further configured to, before the selecting,
   determine a cylindrical region by using at least two nodes in the three-dimensional road image as reference points and by using a preset value as a radial distance value of the cylindrical region;
   select, from the laser point cloud data, one or more laser points falling within the cylindrical region; and
   obtain a three-dimensional laser point cloud surrounding the three-dimensional road image by using the selected one or more laser points, the three-dimensional laser point cloud fitting the three-dimensional road image.

14. The apparatus according to claim 13, wherein the processing circuitry is configured to select the plurality of nodes by:
   selecting a plurality of nodes from the three-dimensional road image;
   defining plural sub-sections of the three-dimensional road image, each of the plural sub-sections being defined between two neighboring nodes of the selected plurality of nodes, and obtaining laser points of the three-dimensional laser point cloud, the obtained laser points corresponding to a respective sub-section of the three-dimensional road image;
   determining a length value of each sub-section of the three-dimensional road image and a degree value of fitting between the respective sub-section of the three-dimensional road image and the laser points of a three-dimensional laser point cloud corresponding to each respective sub-section of the three-dimensional road image;
   determining an accumulated value of differences between the length values and the fitting degree values of the plural sub-sections of the three-dimensional road image; and
   using the plurality of selected nodes as the control points of the first spline curve in a case that the accumulated value satisfies a condition.

15. The apparatus according to claim 14, wherein the processing circuitry is further configured to
   obtain a cost function with the length values of the plural sub-sections as a first variable and the fitting degree values of the plural sub-sections as a second variable;
   adjust a quantity of the plurality of selected nodes;
   repeat the obtaining the cost function and the adjusting to determine a minimum value of the cost function; and
   using, in a case that the minimum value is determined, the adjusted quantity of the plurality of selected nodes resulting in the minimum value of the cost function as the control points of the first spline curve.

16. The apparatus according to claim 15, wherein
   the processing circuitry is configured to adjust the quantity of the plurality of selected nodes by increasing the quantity of the plurality of nodes; and
   the processing circuitry is configured to determine the minimum value of the cost function by:
   determining the length value of each sub-section of the three-dimensional road image formed after each increase in the quantity of the plurality of nodes and the degree value of fitting between the respective sub-section of the three-dimensional road image formed after each increase in the quantity of the plurality of nodes and the laser points of the three-dimensional laser point cloud corresponding to the respective sub-section of the three-dimensional road image; and
   determining the minimum value of the cost function in a case that the cost function first decreases and then increases during successive steps of obtaining the cost function after increasing the quantity of the plurality of nodes.

17. The apparatus according to claim 15, wherein
   the processing circuitry is configured to adjust the quantity of the plurality of selected nodes by decreasing the quantity of the plurality of nodes; and
   the processing circuitry is configured to determine the minimum value of the cost function by:
   determining the length value of each sub-section of the three-dimensional road image formed after each decrease in the quantity of the plurality of nodes and the degree value of fitting between the respective sub-section of the three-dimensional road image formed after each decrease in the quantity of the plurality of nodes and the laser points of the three-dimensional laser point cloud corresponding to the respective sub-section of the three-dimensional road image; and
   determining the minimum value of the cost function in a case that the cost function first decreases and then increases during successive steps of obtaining the cost function after decreasing the quantity of the plurality of nodes.

18. The apparatus according to claim 11, wherein the processing circuitry is configured to convert the first spline curve to the second spline curve by:
   determining a basis function in an equation of the first spline curve; and
   determining a derivative of the basis function in the equation of the first spline curve, and using a curve obtained after the derivation as the second spline curve indicating the road gradient.

19. The apparatus according to claim 11, wherein the processing circuitry is further configured to:
   detect a second road gradient of the two-dimensional road image by using a sensor;
   obtain a first weighting coefficient corresponding to the first road gradient and a second weighting coefficient corresponding to the second road gradient;
   determine a first product value between the first weighting coefficient and the first road gradient;
   determine a second product value between the second weighting coefficient and the second road gradient; and
   determine a final road gradient according to the first product value and the second product value.

20. A non-transitory computer-readable storage medium storing computer-readable instructions thereon, which, when executed by a processor, cause the processor to perform a road gradient determining method comprising:
   obtaining a three-dimensional road image formed by a two-dimensional road image of a road and laser point cloud data of the road;
   selecting a plurality of nodes from the three-dimensional road image as control points, wherein the control points are selected based on an accumulated value of differences between (i) lengths of sub-sections of the three-dimensional road image between neighboring nodes of the selected plurality of nodes and (ii) fitting degree values of laser points of respective three-dimensional laser point clouds corresponding to each sub-section of the three-dimensional road image;

generating, according to the control points, a first spline curve indicating a road elevation;

converting the first spline curve into a second spline curve indicating a road gradient;

obtaining, location information; and determining a first road gradient according to the location information and the second spline curve.

* * * * *